United States Patent [19]

Kubo

[11] Patent Number: 4,747,554
[45] Date of Patent: May 31, 1988

[54] APPARATUS FOR WINDING MAGNETIC TAPE
[75] Inventor: Toyohide Kubo, Tokushima, Japan
[73] Assignee: AWA Engineering Co., Ltd., Tokushima, Japan
[21] Appl. No.: 108,203
[22] Filed: Oct. 14, 1987
[30] Foreign Application Priority Data Mar. 14, 1987 [JP] Japan .................................. 62-59247

[51] Int. Cl.⁴ .......................... B31F 5/06; B65H 21/00
[52] U.S. Cl. .................................... 242/56 R; 156/506
[58] Field of Search .................... 242/56 R, 58.1–58.5; 156/502, 505, 506, 507

[56] References Cited
U.S. PATENT DOCUMENTS

| | | | |
|---|---|---|---|
| 4,497,454 | 2/1985 | Woodley | 242/56 R |
| 4,512,527 | 4/1985 | Rehklau et al. | 242/56 R |
| 4,599,130 | 7/1986 | Woodley | 242/56 R X |
| 4,682,742 | 7/1987 | Woodley et al. | 242/56 R |
| 4,699,328 | 10/1987 | Kreeft et al. | 242/56 R |

Primary Examiner—John M. Jillions
Attorney, Agent, or Firm—Wenderoth, Lind & Ponack

[57] ABSTRACT

An apparatus for winding magnetic tape is provided with a splicing means that greatly improves splicing tape transfer and application reliability. The apparatus comprises retainers for holding leader and magnetic tapes, a cutter for cutting leader and magnetic tapes, a splicing means, and a hub rotating means. The splicing means is provided with a splicing tape feed assembly which feeds splicing tape by the back and forth motion of a feed block which overlaps with an adjacent coplanar retaining block. The feed block and retaining block alternately attach to opposite sides of the splicing tape's nonadhesive surface to reliably advance splicing tape to an applicator block in a linear fashion without tape curl or droop. The applicator block is transported close to the tape cassette to accomplish splicing without superfluous tape extraction.

2 Claims, 7 Drawing Sheets

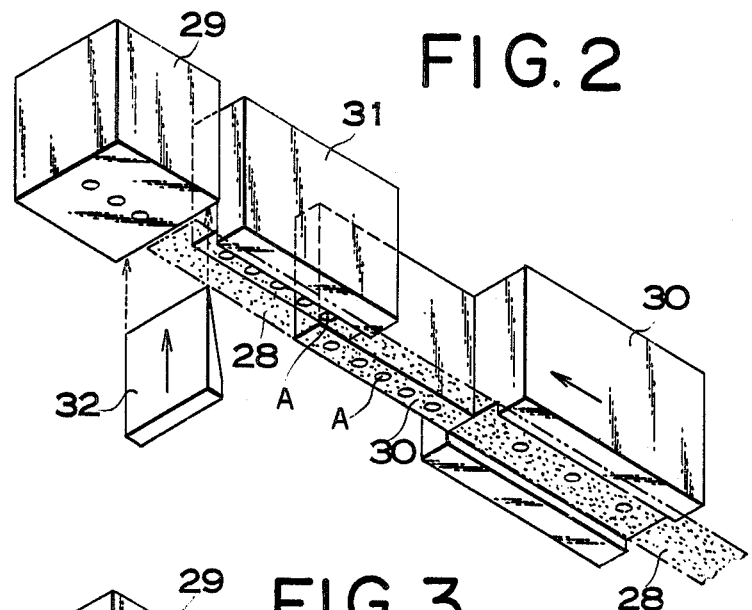
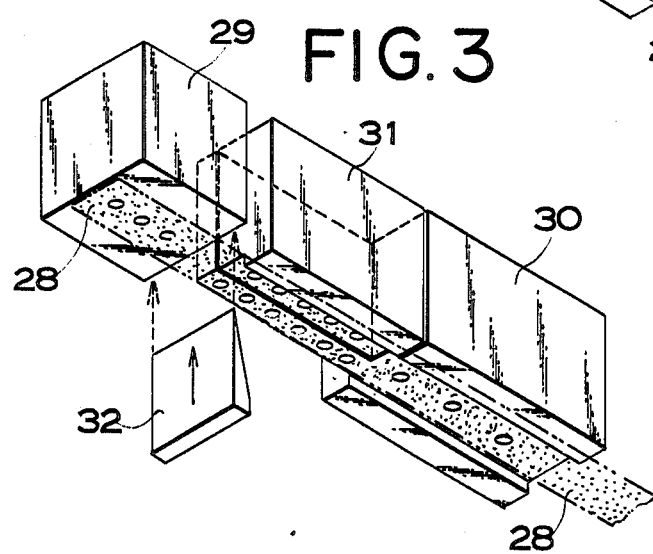

APPARATUS FOR WINDING MAGNETIC TAPE

BACKGROUND OF THE INVENTION

This invention relates to apparatus for joining magnetic tape to leader tape by means of adhesive splicing tape, and winding that magnetic tape onto reel hubs. More particularly, this invention relates to apparatus for winding magnetic tape, in which thin adhesive splicing tape can be utilized.

An apparatus for joining magnetic and leader tape has previously been developed (Japanese Patent Publication No. 12447/1981). As shown in FIG. 1, this apparatus cuts a given length of adhesive splicing tape S attached to the surface of a drum D, attaches the splicing tape S to abutting ends of leader R and magnetic J tapes by pressing the entire drum D onto those tapes, and then presses the surface of the adhesive splicing tape with a roller (not illustrated).

This configuration has the following drawbacks. A large amount of leader tape must be withdrawn from the cassette case to allow sufficient room for the large drum D to maneuver above, and press onto the abutting ends of the leader R and magnetic J tapes. Further, after the large drum D presses splicing tape onto the splice, a roller is required to again press the splice resulting in mechanical complexity, and inability to increase the processing speed of splicing tape S attachment.

As shown in FIG. 12, the present invention eliminates the above drawbacks by cutting a given length of adhesive splicing tape 28' at a separate location, carrying that splicing tape to the abutting ends of the leader 2' and magnetic tapes, and pressing that splicing tape onto those abutting tape ends. The configuration of this apparatus is such that a feed block 30' delivers the end of a fixed length of adhesive splicing tape 28' to a splicing tape retaining block 31' where the splicing tape is then cut to the given length. However, splicing tape 28' transfer is not normally in a linear fashion, and the end of the splicing tape 28' delivered by the feed block 30' fails to attach to the splicing tape retaining block 31'. Therefore, there is a reliability problem in the splicing tape attachment/retention process after splicing tape delivery.

The present invention was developd to eliminate the above mentioned problems. specifically, the primary object of this invention is to provide an apparatus for winding magnetic tape which reliably attaches to, and retains a cut end of adhesive splicing tape, and which can thereby reliably and expedituously splice leader and magnetic tapes.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

SUMMARY OF THE INVENTION

The apparatus of this invention for winding magnetic tape comprises a retaining means for holding ends of magnetic tape and leader tape (which connects to the reel hubs), a cutting means for cutting leader tape and magnetic tape held by the retaining means, a splicing means for joining an end of leader tape cut by the cutting means with an end of magnetic tape, and a hub rotating means for winding magnetic tape onto the hub to which it is connected via leader tape.

After a prescribed amount of tape has been wound onto the reel hub, the magnetic tape is held by the retaining means, cut with the cutting means, and this trailing end of magnetic tape is joined to the remaining severed end of leader tape by the splicing means.

The splicing means is provided with a splicing tape feed assembly which comprises a splicing tape retaining block to temporarily hold adhesive splicng tape used for joining leader and magnetic tapes, a feed block which reciprocates with respect to the splicing tape retaining block and delivers splicing tape to that retaining block, and an actuating means to reciprocate the feed block.

The feed block is provided with a tape attachment surface which temporarily retains adhesive splicing tape during the feed block's forward moving cycle and releases that splicing tape during the retreating cycle. The splicing tape retaining block is provided with a tape attachment surface which releases adhesive splicing tape during the feed block's forward moving cycle and retains that splicing tape during the retreating cycle. The feed block and splicing tape retaining block attachment surfaces are coplanar and located on both sides of a surface along which adhesive splicing tape is transferred. The feed block tape attachment surface reciprocates in line with the splicing tape retaining block attachment surface; one side of the splicing tape is attached to the feed block during forward movement of the feed block, and the other side of the splicing tape is attached to the splicing tape retaining block during retreating movement of the feed block.

BRIEF DESCRIPTION OF THE DRAWINGS

FIG. 2 and FIG. 3 are diagrammatic perspective side views of the splicer;

DETAILED DESCRIPTION OF THE INVENTION

Figure 1:
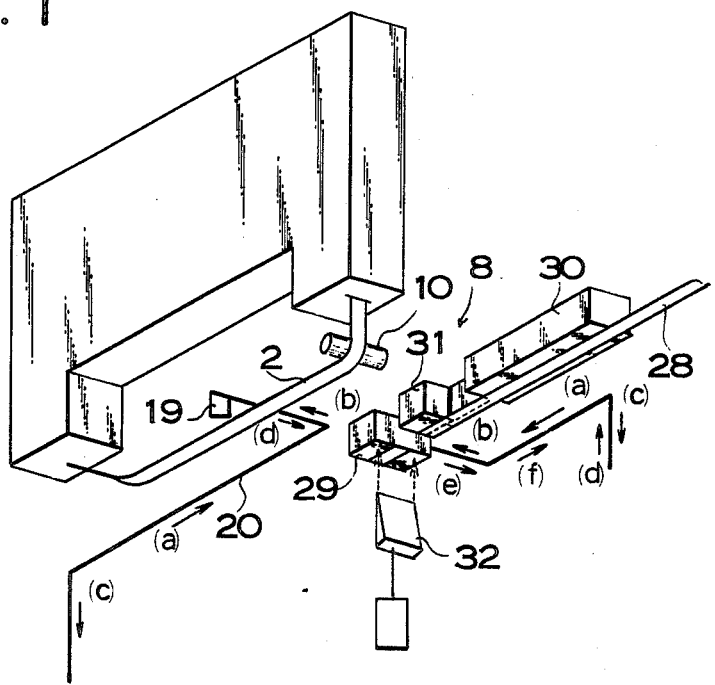
FIG. 1 and FIG. 4 are diagrammatic perspective side views and plan view showing the movement of the retaining means.

The preferred embodiment of the present invention is described based on illustrations as follows.

The apparatus for winding magnetic tape shown in FIG. 1 and FIG. 4 through FIG. 6 comprises a retaining means for holding ends of magnetic tape 6 as well as leader tape 2, which has been withdrawn from a cassette case 1 secured at a prescribed location by a positioning means (not illustrated), a cutting means 7 for cutting leader tape 2 and magnetic tape 6 held by the retaining means, a splicing means 8 for joining cut ends of leader tape 2 and magnetic tape 6 by attaching adhesive splicing tape, and a hub rotating means (not illustrated) for winding magnetic tape 6 onto one of the hubs 24 inside the cassette case 1.

Figure 6:
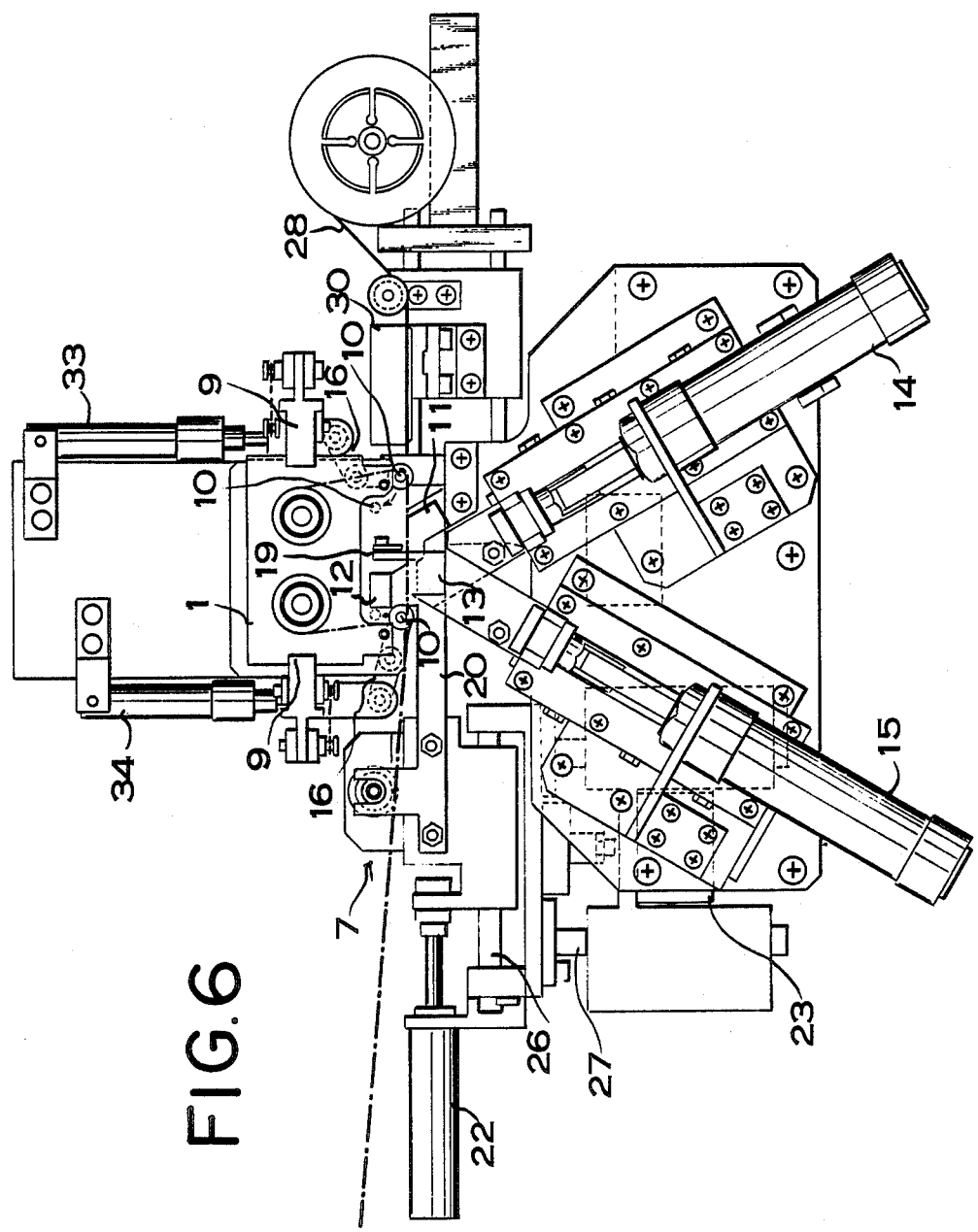
FIG. 6 is a plan view of an apparatus for winding magnetic tape which constitutes a preferred embodiment of the present invention.

The cassette case 1 positioning means has been used in former models. Any configuration which can secure the cassette case in a fixed position and open the cassette front cover can be utilized. For example, a configuration with claws 9 located on both sides of the cassette case, as shown in FIG. 6, may be used. The claws 9 apply pressure to grip the cassette case 1 by means of springs or other flexible media, or by means of an actuator cylinder.

The cassette case 1 front cover 36 opening assembly is also a standard assembly used in former apparatus. For example, an assembly which releases the cassette case front cover lock and opens the front cover 36 with an arm or similar member may be used.

The retaining means comprises two tape extraction rollers 10 for withdrawing leader tape 2 from the cassette, a first 11, second 12, and third 13 tape retainer for attaching to the back sides of leader tape 2 and magnetic tape 6, and two actuator cylinders 14 and 15 for moving the second 12 and third 13 tape retainers.

The tape extraction rollers 10 draw leader tape from the cassette case 1 and guide it to the attachment surfaces of the first 11 and second 12 tape retainers. The two tape extaction rollers 10 are mounted on two tape extraction arms 16 in a manner that allows them to rotate freely. The tape extraction rollers 10 are moved by the tape extraction arms 16 from the broken line positions shown in FIG. 4, to the solid line positions, thereby unwinding leader tape 2 from the cassette case 1.

Figure 5:
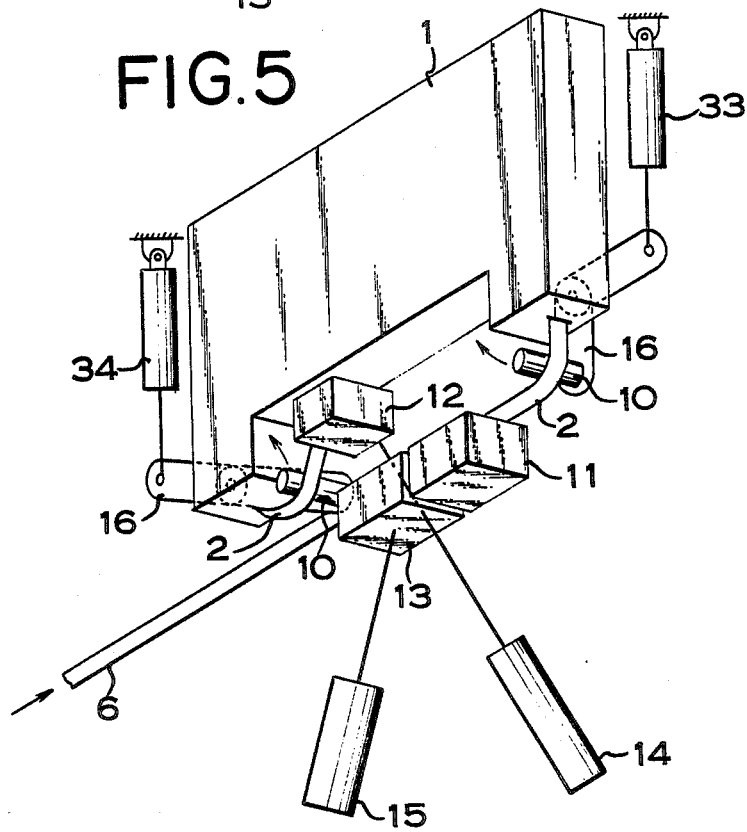
FIG. 5 is a diagrammatic perspective view of the cutting means and the splicing means.

As shown in FIG. 5, the tape extraction arms 16 are installed behind the cassette case 1, and are free to swing through a vertical plane. One end of each tape extraction arm 16 is attached at a right angle to a tape extraction roller 10, while the other end is connected via a rod to an actuator cylinder. Two actuator cylinders 33 and 34 activate the two tape extraction arms 16.

Although it is not illustrated, suction holes are provided on the upper (attachment) surfaces of the first 11, second 12, and third 13 tape retainers for the purpose of holding leader tape 2 and magnetic tape 6 in place. These suction holes are connected to a vacuum means.

The attachment of tape to the tape retainers 11, 12, and 13, etc. may be accomplished by means of static electrical attraction instead of by suction.

The first tape retainer 11 is fixed to a stationary frame, while the second 12 and third 13 tape retainers connect to, and are moved by the actuator cylinders 14 and 15.

Figure 4:
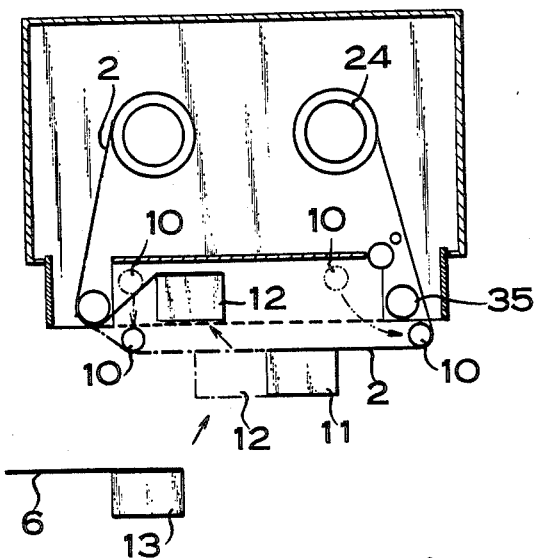

The second tape retainer 12 attaches to leader tape 2 initially drawn from the cassette case 1. As shown in FIG. 4, FIG. 5, and FIG. 6, the second tape retainer 12 is put in a standby position inside the cassette case front cavity while the magnetic tape 6 winding process is performed.

The third tape retainer 13 attaches only to magnetic tape 6. It is moved to the position shown in FIG. 5 (the broken line position shown in FIG. 4) for splicing with leader tape 2, and during the process of winding magnetic tape 6 into the cassette case 1. The third tape retainer 13 is moved to the solid line position of FIG. 4 during leader tape 2 cutting.

Figure 7:
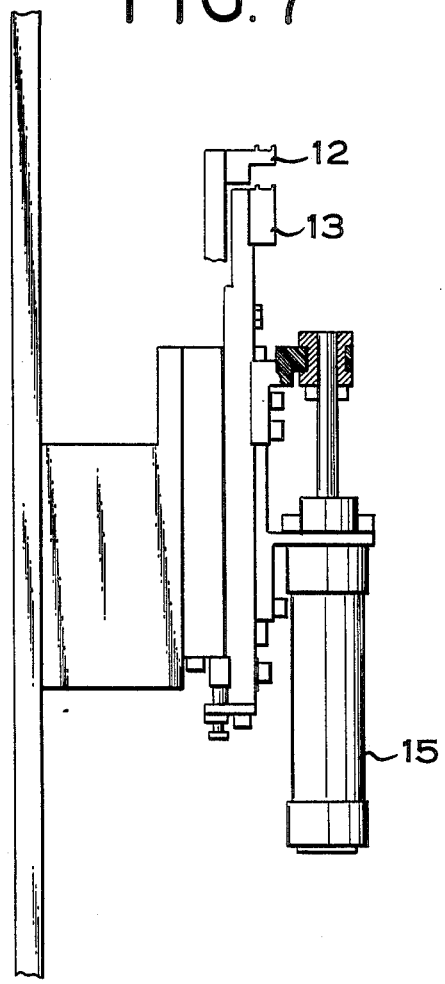
FIG. 7 is a side view showing the mechanism for reciprocating the second and third tape retainers.

As shown in FIG. 5 and FIG. 6, the second 12 and third 13 tape retainers are mounted on the ends of actuator rods from the actuator cylinders 14 and 15. As shown in FIG. 5 and FIG. 7, the second 12 and third 13 tape retainers are positioned to hold tape in the same vertical plane, however the second tape retainer 12 actuator rod is located in back of the third tape retainer 13 actuator rod to allow independent tape retainer movement.

Figure 8:
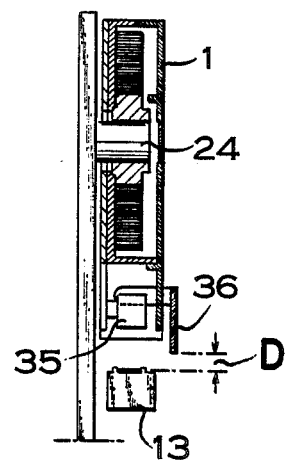
FIG. 8 is a side view in cross section showing a cassette case with its front cover opened.

As shown in FIG. 8, while the first 11 and second 12 tape retainers hold the uncut leader tape 2, the area around the tape is covered by the cassette case 1 and the cassette case front cover, thereby offering protection against dust and foreign objects. Consequently at this stage, the first 11 and second 12 tape retainers are located adjacent to the cassette case front cover and the associated front cavity.

During the process of winding magnetic tape 6 into the cassette case 1, the second tape retainer 12 is moved to a standby position out of the path of the magnetic tape 6. However, in this case as well, leader tape 2 extraction is minimized by keeping the standby position of the attachment surface of the second tape retainer 12 close to the cassette case front cover.

Figure 9:
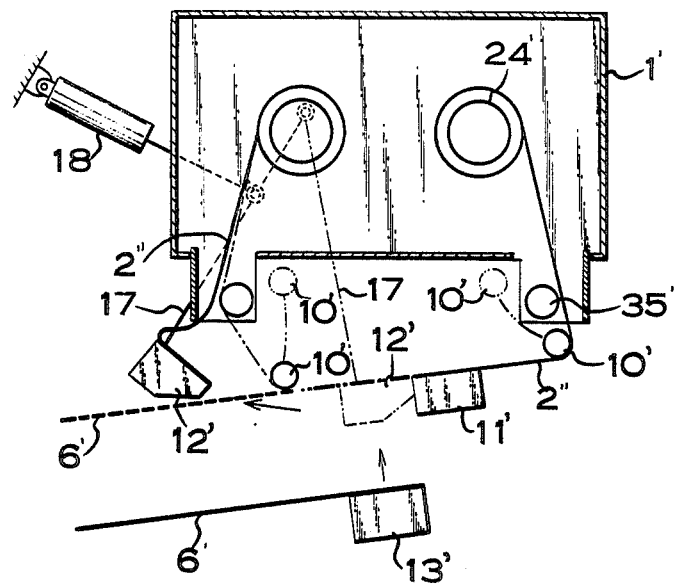
FIG. 9 is a diagrammatic plan view showing tape retainer movement for an alternate preferred embodiment of the present invention.

The second tape retainer 12' shown in FIG. 9 is mounted on the end of a rotating arm 17 which pivots the second tape retainer 12', from a position adjacent to the first tape retainer 11', in a direction away from the cassette case 1'. The rotating arm 17 is rotated by an actuator cylinder 18, and is installed behind the cassette case 1' to avoid interference with the cassette.

Figure 10:
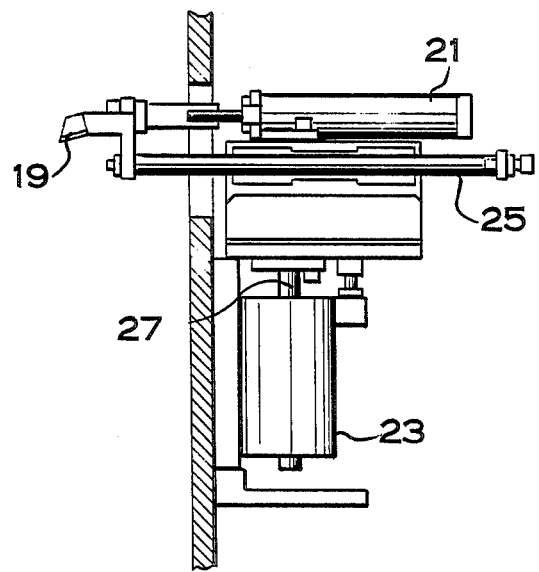
FIG. 10 is a side view showing the fore and aft movement of the cutter.
Figure 11:
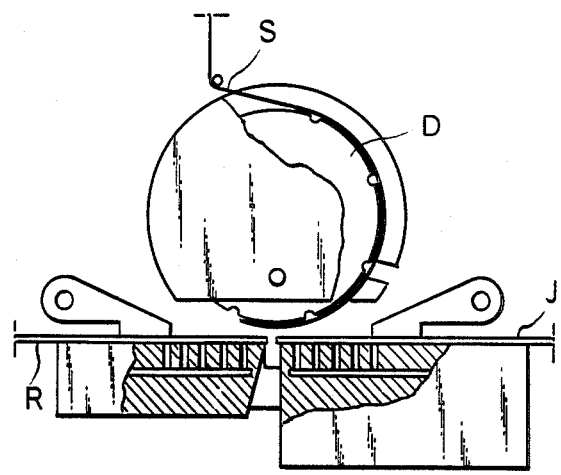
FIG. 11 and FIG. 12 are plan views showing specific examples of prior apparatus.
Figure 12:
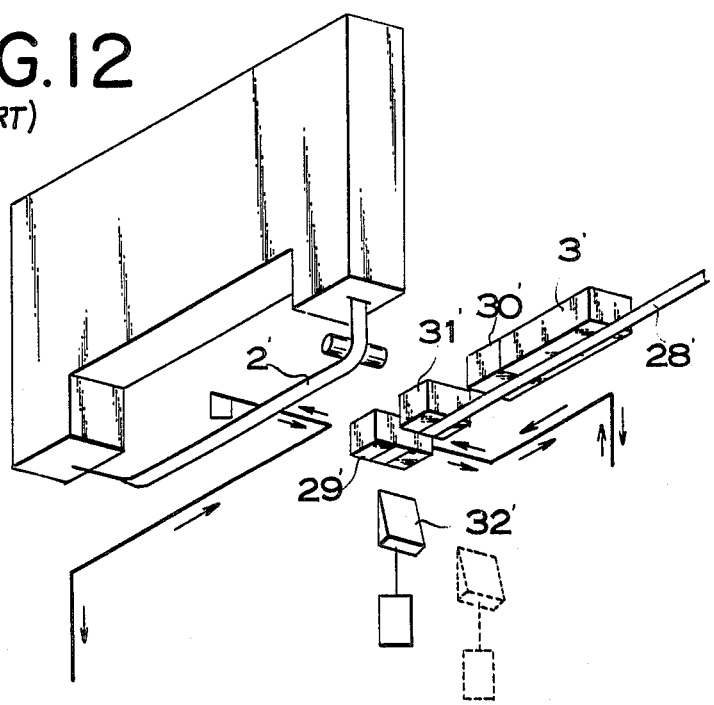

As shown in FIG. 1, FIG. 6, and FIG. 10, the cutting means 7 is provided with a cutter 19, a movable frame 20 which manipulates the cutter 19 to sever tape, an actuator cylinder 21 to move the frame 20 for and aft (referring to the directions of FIG. 1), an actuator cylinder 22 to move the frame 20 left and right, and an actuator cylinder 23 to move the frame 20 up and down. In the cutting means shown in FIG. 6 and FIG. 10, the movable frame 20 is mounted on the end of the actuator rod of the for and aft actuator cylinder 21. The for and aft actuator cylinder 21 is connected to the actuator rod of the left right actuator cylinder 22, which in turn is connected to the actuator rod of the up and down actuator cylinder 23. The up and down actuator cylinder is fixed to the stationary frame of the apparatus. The movable frame 20 is guided parallel to guide bars 25, 26, and 27, which extend in the for and aft, left and right, and up and down directions respectively.

Referring to FIG. 1, tape is cut by the cutter 19 as follows.

(a) The cutter 19, originally positioned behind the tape, is moved to the right to a cutting position at the center of the tape. The movable frame 20 is in the raised position during this operation.

(b) Next, still in the raised position, the cutter 19 is moved forward to a position on top of the leader tape 2 or magnetic tape 6.

(c) The cutter 19 is lowered to the surface of the tape for cutting.

(d) The cutter 19 is drawn back severing the leader tape 2 or magnetic tape 6.

Turning now to the splicing means illustrated in FIG. 1, FIG. 2, and FIG. 3, the splicing means is provided with a splicing tape applicator block 29 for attaching to a piece of adhesive splicing tape 28 and for pressing that splicing tape onto the upper surface of abutting leader 2 and magnetic 6 tapes, three actuator cylinders (not illustrated) for moving the splicing tape applicator block 29 fore and aft, left and right, and up and down, and a splicing tape feed assembly for delivering adhesive splicing tape 28 to the splicing tape applicator block 29.

The splcing tape applicator block 29 is constructed in the same manner as the cutting means movable frame 20 with three sets of actuator cylinders and guide bars. The splicing tape applicator block 29 joins leader tape 2 and magnetic tape 6 with adhesive splicing tape 28, which is attached to the bottom surface of the splicing tape applicator block, as follows.

(1) With magnetic tape 6 attached to the third tape retainer 13 and leader tape 2 attached to the first tape retainer 11 as shown in FIG. 5, the splicing tape applicator block 29 is moved left, in the raised position, to line up with the abutting leader and magnetic tape ends (splicing tape applicator block 29 motion (a) shown in FIG. 1).

(2) Still in the raised position, the splciing tape applicator block 29 is moved forward to a position above the tape (applicator block motion (b) shown in FIG. 1).

(3) The splicing tape applicator block 29 is lowered, and adhesive splicing tape 28 is pressed onto the abutting ends of leader tape 2 and magnetic tape 6 to join them (applicator block motion (c) shown in FIG. 1).

(4) The splicing tape applicator block 29 is raised (applicator block motion (d) in FIG. 1).

(5) The splicing tape applicator block 29 is moved rearward away from the tape (applicator block motion (e) shown in FIG. 1).

(6) The splicing tape applicator block 29 is moved to the right, returning it to the standby position (applicator block motion (f) shown in FIG. 1).

Steps (1) through (6) are repeated for each splice thereafter, thus joining leader 2 and magnetic 6 tapes by attaching adhesive splicing tape 28 to their upper surfaces.

Turning now to FIG. 2 and FIG. 3, the splicing tape feed assembly, which delivers a prescribed length of adhesive splicing tape 28 to the bottom surface of the splicing tape applicator block 29 comprises a feed block 30 which draws adhesive splicing tape 28 off of a spool, a splicng tape retaining block 31 located between the feed block 30 and the splicing tape applicator block 29, which attaches to the nonadhesive side of the leading end of adhesive splicing tape 28, and a cutter 32 which cuts the adhesive splicing tape 28 at the surface of the splicing tape applicator block 29 that faces the splicing tape retaining block 31.

The bottom attachment surfaces of the splicing tape retaining block 31 and the feed block 30 are located in the same plane, and suction holes A are provided through those attachment surfaces to allow attachment to the adhesive splicing tape 28. The suction holes A are are connected to a vacuum system (not illustrated) through control valves. Adhesive splicing tape 28 attaches to the attachment surfaces when the control valves are open creating suction through the suction holes A.

The feed block 30 and splicing tape retaining block 31 attachment surfaces are adjacently located within the surface through which adhesive splicing tape 28 is transferred. One side of the adhesive splicing tape 28 attaches to the splicing tape retaining block 31, and the other side attaches to the feed block 30 allowing reliable transfer of thin adhesive splicing tape 28 to the splicing tape retaining block 31 without physical tape distortion. Referring to FIG. 2 and FIG. 3, The attachment surface of splicing tape retaining block 31 is positioned on the right half of the adhesive splicing tape 28, and the attachment surface of the feed block 30 is positioned on the left half of the adhesive splicing tape 28.

As shown in FIG. 2, it is desirable for the forward edge of the feed block 30 to slightly overlap with respect to the trailing edge of the splicing tape retaining block 31 even when the feed block 30 is in the retracted (aft) position. This configuration allows the most reliable transfer of adhesive splicing tape 28 to the splicing tape retaining block 31. However, a configuration allowing slight separation between the splicing tape retaining block 31 and the feed block 30 when the feed block 30 is in the retracted position, and allowing alignment of the forward edges of the feed block 30 and splicing tape retaining block 31 when the feed block 30 is in the forward position, is also obviously permissible.

Referring to FIG. 2, the feed block 30 moves forward from right to left, while attached to the adhesive splicing tape 28, to transfer a prescribed length of adhesive splicing tape 28 to the splicing tape retaining block 31 and splicing tape applicator block 29. Adhesive splicing tape 28 is not attached to the splicing tape retaining block 31 during this movement. During retraction of the feed block 30 from the position shown in FIG. 3 to the position shown in FIG. 2, adhesive splicing tape 28 is attached to the splicing tape retaining block 31 but not to the feed block 30.

The cutter 32 is raised to cut adhesive splicing tape 28 held attached to the splicing tape applicator block 29 and splicing tape retaining block 31 at a position in line with the trailing surface of the splicing tape applicator block 29 which faces the splicing tape retaining block 31.

During splicer operation in which leader 2 and magnetic 6 tapes are joined, the cutter 19, which cuts either leader 2 or magnetic tape 6, is withdrawn to a standby position out of the path of the splicing tape applicator block 29.

The operation of the splicer illustrated in FIG. 1 through FIG. 3 is explained in the following.

While one side of the adhesive splicing tape 28 is is held by the splicing tape retaining block 31, the feed block 30 retracts to the position shown in FIG. 1 and FIG. 2. The adhesive splicing tape 28 is not attached to the feed block 30 during this action. One side of the adhesive splicing tape 28 is then attached to the feed block 30, which moves forward. During this action, adhesive splicing tape 28 is released from the splicing tape retaining block 31. By this action, the adhesive splicing tape 28 is advanced to a position protruding from the forward edge of the splicing tape retaining block 31, as shown in FIG. 3. During advancement of the adhesive splicing tape 28 to this protruding position, the splicing tape 28 does not droop down by gravity because one side of that tape is attached to the feed block 30. After the adhesive splicing tape 28 protudes from the splicing tape retaining blcok 31, it can be retained there by attachment to either the splicing tape retaining block 31 or to both the splicing tape retaining block 31 and the feed block 30.

A transportable splicing tape applicator block 29 is lowered onto and attached to the upper surface of the adhesive splicing tape 28. At this point, a cutter 32 is raised to sever the leading end of adhesive splicing tape 28 to a prescribed length. The severed piece of splicing tape 28 is carried to the abutting ends of leader 2 and magnetic tapes, and used to splice those tapes together.

Since one side of the splicing tape is attached to the reciprocating feed block when the feed block moves forward along the splicing tape retaining block and the other side of the splicing tape is attached to the splicing tape retaining block when the feed block retreats along the splicing tape retaining block, adhesive splicing tape 28 can be reliably delivered to a prescribed point, thereby drastically reducing splicing tape attachment failure. Thus, reliable leader and magnetic tape splicing is realized.

It should be emphasized that the present invention is not limited to configurations in which adhesive splicing tape 28 is transferred in the horizontal direction by attachment to the bottom surfaces of the splicing tape applicator block 29, the splicing tape retaining block 31, and the feed block 30. For example, an apparatus which is an inverted version of the apparatus shown in FIG. 6 is also possible. In this case, adhesive splicing tape 28 is transferred in the horizontal direction by attachment to the upper surfaces of the splicing tape applicator block 29, the splicing tape retaining block 31, and the feed block 30. Consequently, adhesive splicing tape 28 is transferred by this configuration does not droop downward by gravity, and in this configuration as well, reliable tape transfer can be accomplished by attachment to one surface of the adhesive splicing tape 28.

Further, in the case where adhesive splicing tape 28 is transferred downward in the vertical direction (a configuration in which the apparatus of FIG. 6 is rotated 90 degrees counter clockwise), tape transfer by gravity without physical tape distortion appears to be possible. However, adhesive splicing tape 28 which is unwound from a spool has a natural tendency to curl. Attachment to one surface of the adhesive splicing tape 28 with the feed block 30 straightens this curl and allows proper transfer of tape in a linear fashion.

The apparatus for winding magnetic tape having the configuration described above, winds magnetic tape into cassettes by the following procedure.

(1) The cassette case 1 is secured in a fixed position and the front cover is opened.

(2) The tape extraction rollers 10 insert inside the exposed leader type 2, draw leader tape 2 from the cassette case 1, and attach it to the upper surfaces of the first 11 and second 12 tape retainers. At this point, the first 11 and second 12 tape retainers are adjacent with their attachment surfaces lined up in the same plane, and the third tape retainer 13 is in a standby location shown by the solid line position of FIG. 4.

(3) The cutter 19 severs the leader tape 2 between the first 11 and second 12 tape retainers. During this operation, the leader tape 2 is held attached to the first 11 and second 12 tape retainers.

(4) The second tape retainer 12 is moved away from the first type retainer 11 to a standby position, and the third tape retainer 13 is moved adjacent to the first tape retainer 11 so that its upper surface lines up in the same plane with that of the first tape retainer 11. At this stage also, leader tape 2 is held attached to the first 11 and second 12 tape retainers, and magnetic tape 6 is held attached to the third tape retainer 13.

(5) The leader tape 2 and magnetic tape 6 held by the adjacent and coplanar first 11 and third 13 tape retainers, are joined together by the splicing means.

(6) Next, the spliced leader 2 and magnetic 6 tapes are released from the first 11 and third 13 tape retainers, and the cassette hub 24 to which the leader tape 2 is attached is rotated by the hub rotating means to wind the connected magnetic tape 6 into the cassette case 1.

(7) After a prescribed length of magnetic tape 6 has been wound, hub 24 rotation is ceased, and the first 11 and third 13 tape retainers attach to the magnetic tape 6.

(8) The magnetic tape 6 is severed by the cutter 19 between the first 11 and third 13 tape retainers.

(9) The third tape retainer 13, with the magnetic tape 6 attached, is moved to its standby position shown by solid lines in FIG. 4, and the second tape retainer 12 is moved from its solid line standby position to the broken line position shown in FIG. 4, adjacent to the first tape retainer 11.

(10) The trailing end of the magnetic tape 6 held by the first tape retainer 11 is joined by the splicing means to the cut end of leader tape 2 held by the second tape retainer 12. In steps (8), (9), and (10), tape is held attached to the first 11, second 12, and third 13 tape retainers.

(11) Tape is released from the first 11 and second 12 tape retainers, and the tape extraction rollers 10 are moved to the broken line positions shown in FIG. 4.

(12) The hub 24 is rotated to take up the slack tape into the cassette case 1.

(13) The cassette case 1 is replaced with another case not yet wound with magnetic tape 6.

This procedure is repeated to wind magnetic tape 6 into subsequent cassette cases.

As previously mentioned, an inverted version of the apparatus shown in FIG. 6 is also possible, and in this case the cassette case front cavity faces upward and the upper surface of the extracted leader tape is covered by the tape retainers.

What is claimed is:

1. An apparatus for winding magnetic tape comprising:
  (a) a retaining means for holding ends of magnetic tape, and ends of leader tape which connect to reel hubs onto which tape is wound;
  (b) a cutting means for cutting leader and magnetic tapes held by the retaining means;
  (c) a splicing means for joining abutting ends of leader and magnetic tape cut by the cutting means; and
  (d) a hub rotating means for rotating the hub to which magnetic tape is connected via leader tape thus winding magnetic tape onto that hub, so that after a prescribed amount of tape has been wound onto the reel hub, the magnetic tape is held by said retaining means, cut by said cutting means, and the cut trailing end of magnetic tape is joined to the remaining cut end of leader tape by said splicing means;
  characterized in that the splicing means comprises a splicing tape feed assembly comprising a splicing tape retaining block for temporarily holding adhesive splicing tape used to join leader and magnetic tapes, a feed block which reciprocates with respect to the splicing tape retaining block and feeds adhesive splicing tape to the splicing tape retaining block, and an actuating means for reciprocating the feed block, wherein the feed block is provided with a tape attachment surface which temporarily retains adhesive splicing tape during the feed block's forward movement and releases that tape during the feed block's retreating movement, the splicing tape retaining block is provided with a tape attachment surface which releases adhesive splicing tape during the feed block's forward movement and retains that tape during the feed block's retreating movement, the feed block and splicing tape retaining block attachment surfaces are coplanar and located on either side of the adhesive splicing tape feed track, the feed lock tape attachment surface reciprocates back and forth parallel to the splicing tape retaining block tape attachment surface, and one side of the adhesive splicing tape is attached to the feed block during the feed block's forward movement and the other side of the adhesive splicing tape is attached to the splicing tape retaining block during the feed block's retreating movement.

2. An apparatus for winding magnetic tape as claimed in claim 1 in which the feed block and splicing tape retaining block tape attachment surfaces are provided with suction holes.

* * * * *